United States Patent [19] [11] 4,137,721
Glennon et al. [45] Feb. 6, 1979

[54] CONTROL SYSTEM FOR PLURAL ENGINES

[75] Inventors: Timothy F. Glennon; Dennis T. Faulkner, both of Rockford, Ill.

[73] Assignee: Sundstrand Corporation, Rockford, Ill.

[21] Appl. No.: 818,066

[22] Filed: Jul. 22, 1977

[51] Int. Cl.² ............................................ F01B 21/00
[52] U.S. Cl. ........................................ 60/711; 60/716
[58] Field of Search ............... 60/702, 706, 711, 710, 60/716, 719; 318/98, 99

[56] References Cited
U.S. PATENT DOCUMENTS

| 2,103,274 | 12/1937 | Sanford | 60/706 |
| 3,234,740 | 2/1966 | Moore | 60/710 |
| 3,511,052 | 5/1970 | Gillespie | 60/711 |

Primary Examiner—Allen M. Ostrager
Attorney, Agent, or Firm—Wegner, Stellman, McCord, Wiles & Wood

[57] ABSTRACT

Two gas turbine helicopter engines are coupled together for isochronous operation to supply a common load. A control circuit assures that the power delivered to the common load is equally divided between the two engines. The torque of each engine is detected and the torques are compared to established control signals for the engines.

11 Claims, 1 Drawing Figure

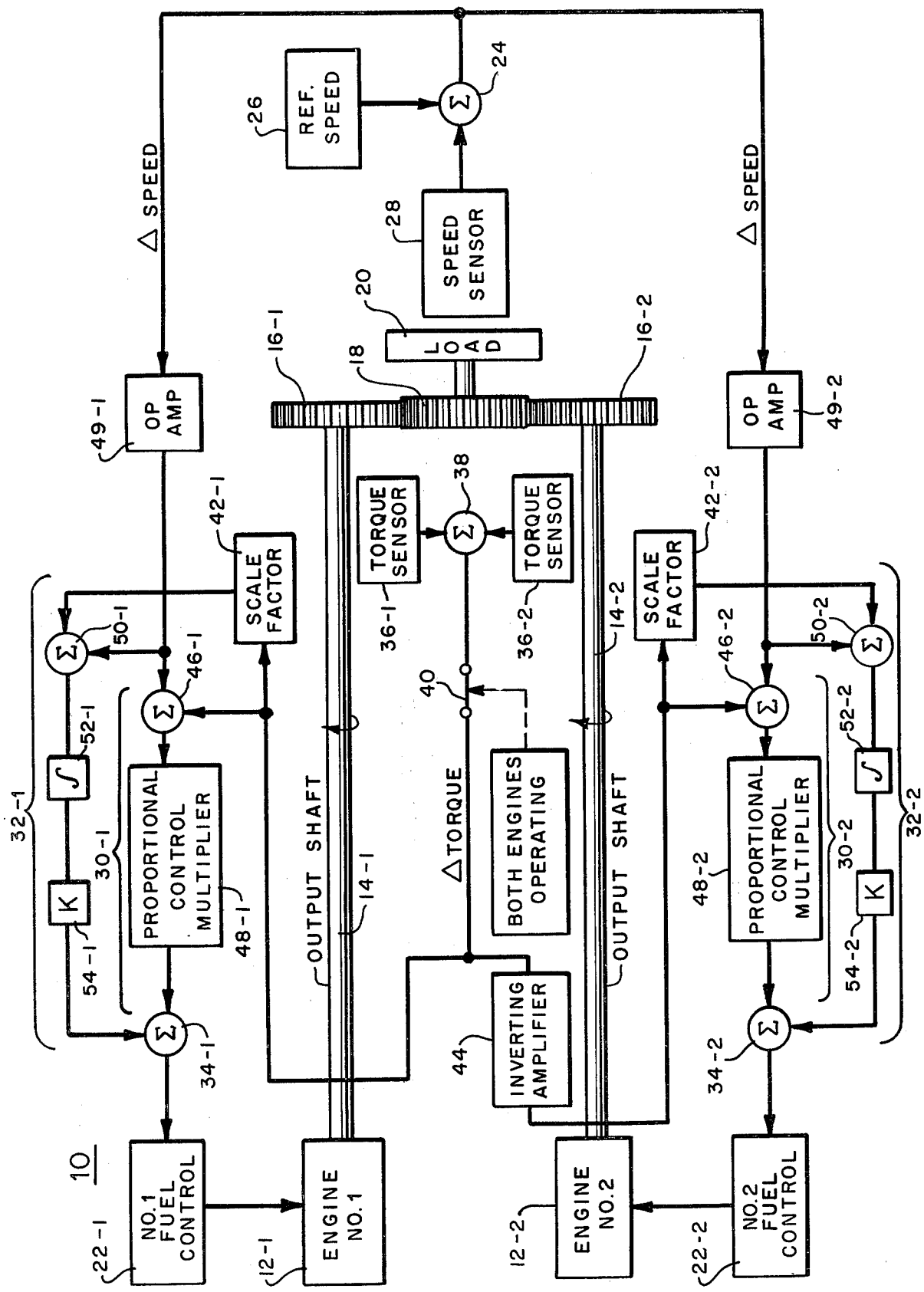

CONTROL SYSTEM FOR PLURAL ENGINES

BACKGROUND OF THE INVENTION

This invention relates to a system for controlling plural engines in a power plant and, more particularly, to a control circuit for assuring that power provided to a common load is properly shared by the engines.

Output shafts of plural engines are often interconnected to provide isochronous operation and to provide power to a common load. A control system is usually provided to equally divide the load between the two engines. Since the engines are made to operate at a common speed, the load is balanced or equally shared by increasing or decreasing the torque output from each engine. Most control systems are of the hydraulic or pneumatic type. Prior art systems for load sharing of coupled engines employ droop control wherein the output of the engine providing less than its share of torque is increased to match the output torque provided by the other engine.

Helicopter power plants often employ two similar engines, as gas turbine engines which, coupled together for isochronous operation, provide power to a common load. The most efficient operation of the plant is realized when each engine is supplying its half of the torque requirement.

SUMMARY OF THE INVENTION

The output shafts of two engines of a power plant are interconnected for isochronous operation. Each engine provides its share of power to the load by increasing or decreasing the magnitude of its output torque in response to a control signal. Each control signal is responsive to the difference between a reference speed and the actual isochronous speed and any torque difference between the two engines. Each control signal is applied to a fuel control circuit which controls the output torque of the engine in response to its control signal.

It is a feature of the invention to provide a control circuit for a power plant having plural engines which are to contribute power to a common load.

Another feature of the invention is to provide a control circuit which assures that the power delivered to the load from two engines is equally divided during isochronous operation.

Yet a further feature of the invention is to provide such a control circuit which equally divides the power between two engines of a power plant during steady state operation and during transient disturbances.

DRAWING

The drawing is a block diagram of the control circuit for dividing a common load betwen two engines.

DESCRIPTION OF PREFERRED EMBODIMENT

Power plant 10 includes similar engines 12-1 and 12-2. The engines each have an output shaft 14-1 and 14-2 which are coupled to gears 16-1 and 16-2, respectively. Gears 16-1 and 16-2 drive gear 18 in an isochronous manner to provide power to common load 20. Engines 12-1 and 12-2 may be gas turbine engines specifically adapted to provide power to a helicopter load 20 being the helicopter rotor. The power contributed to load 20 by each engine is usually equal. However, other proportions may be established, as will be apparent when considering the system discussed below.

The power developed by engines 12-1 and 12-2 is directly proportional to the fuel provided thereto by fuel control circuits 22-1 and 22-2. The amount of fuel so provided is proportional to the magnitude of control signals applied to the fuel control circuits 22-1 and 22-2, respectively.

The speed at which the output shafts 14 rotate is controlled by a signal Δspeed from summer 24. The signal Δspeed represents the difference between a selected reference speed and the actual speed. The signal representing the desired or reference speed is provided by reference speed circuit 26 and the signal representative of the actual speed is provided by speed sensor 28. When the actual speed equals the reference speed, the signal Δspeed from summer 24 is zero.

The Δspeed signal from summer 24 is provided to proportional control channels 30-1 and 30-2 and integral control channels 32-1 and 32-2. The proportional control channels 30-1 and 30-2 are connected in parallel with integral control channels 32-1 and 32-2 respectively. The outputs of the channels are applied to summers 34-1 and 34-2, respectively. The outputs of summers 34-1 and 34-2 are the control signals for fuel control circuits 22-1 and 22-2, respectively.

The torque provided on the output shafts 14-1 and 14-2 is sensed by torque sensors 36-1 and 36-2, respectively, and a signal representing the torque of each shaft is provided to summer 38. The output of summer 38 is a signal, Δtorque, which represents the torque difference or imbalance between the shafts. The output of summer 38 is coupled to the system through switch 40 which is normally closed when both engines are operating. The torque difference signal from summer 38 is of one polarity or sense and is applied to proportional control 30-1 and integral control 32-1 through scale factor 42-1. The torque difference signal of the opposite polarity or sense, as provided by an inverting amplifier 44, is applied to proportional control 30-2 and to integral control 32-2 through scale factor 42-2. If scale factors 42-1 and 42-2 are equal, the signal representing the torque difference applied to proportional control channel 30-1 and integral control channel 32-1 is equal to and of opposite sense or polarity from the signal representing the torque difference applied to proportional control channel 30-2 and integral control channel 32-2. When the torque on output shaft 14-1 is equal to the torque on output shaft 14-2, the output from summer 38 and inverter 44 is zero.

The operation of proportional control channel 30-1 and integral control channel 32-1 will now be considered it being understood that proportional control channel 30-2 and integral control channel 32-2 operate in a similar manner. Proportional control channel 30-1 includes a summer 46-1 and proportional control multiplier 48-1 which acts as an active gain and compensation circuit. The signals Δspeed for op amp 49-1 and Δtorque from summer 38 are applied as inputs to proportional control multiplier 48-1 through summer 46-1. The output of proportional control multiplier 48-1 is applied to summer 34-1. The multiplier is selected in accordance with the dynamic operating conditions of the system. During steady state operation the output from proportional control multiplier 48-1 is zero. The output from proprotional control multiplier 48-1 increases or decreases fuel control 22-1 through summer 34-1 in response to the transient disturbances.

Integral control channel 32-1 includes a summer 50-1, an integrator 52-1 and a K multiplier 54-1. The output from integrator 52-1 is applied to multiplier 54-1 and is a non-zero value during steady state operation. The time constant of the integrator 52-1 is selected to be sufficiently long so as not to be affected by transient disturbances. The gain of multiplier 54-1 is selected to provide an output of suitable magnitude for steady state operation.

Generally, the torque provided by engine 12-1 equals the torque provided by engine 12-2. However, this is not a requirement. For example, by the appropriate selection of scale factors 42-1 and 42-2, load sharing between the two engines may be established for any particular proportions. The proportional side would also require a scale factor to accomplish this object.

We claim:

1. In a power plant having a plurality of engines the outputs of which are coupled together for isochronous operation, each engine providing an output torque proportional to a control signal, an improved control circuit for assuring that the torque is shared between the engines comprising:
   means for generating a torque difference signal proportional to any difference in the output torques between the engines;
   means for generating a speed error signal proportional to any difference between a selected reference speed and the actual speed of the engines; and
   means for combining said speed error signal with said torque unbalance signals to provide a control signal for each engine.

2. The power plant of claim 1 wherein the torque is shared equally between the engines.

3. The power plant of claim 1 wherein the plurality of engines includes two engines and the torque is equally shared between said two engines.

4. In a power plant having a first and a second engine, the outputs of which are coupled together for isochronous operation, each engine providing an output torque proportional to a control signal, an improved control circuit for assuring that the torque provided by the first and the second engines is shared comprising:
   means for generating a torque difference signal proportional to any difference between the output torques of the first and second engines;
   means for generating a speed error signal proportional to any difference between a selected reference speed and the actual speed of the engines;
   means for combining said speed error signal with said torque difference signal in one sense to provide a control signal for the first engine;
   means for combining said speed error signal with said torque difference signal in the opposite sense to provide a control signal for the second engine; and
   means for controlling each of said engines in accordance with the control signal therefor.

5. The power plant of claim 4 wherein the means for combining said speed error signal with said torque difference signal to provide the control signal for the first engine and the control signal for the second engine each include:
   a proportional control channel for generating a signal responsive to transient differences between the torque difference signal and the speed error signal;
   an integral control channel coupled in parallel with the proportional control channel for generating a signal responsive to any steady state difference between said torque difference signal and said error signal; and
   means for summing the signals from the proportional control channel and the integral control channel to provide the control signal therefor.

6. The power plant of claim 1 including:
   a first torque sensor for providing a signal indicative of the output torque of the first engine;
   a second torque sensor for providing a signal indicative of the output torque of the second engine; and
   a summer coupled to the first and second sensors, the output providing said torque difference signal in one sense.

7. The power plant of claim 6 further including:
   an inverter coupled to the summer, the output of the inverter providing said torque difference signal in the opposite sense.

8. The power plant of claim 4 wherein the torque provided by the first and the second engines is shared equally.

9. The power plant of claim 4 further including switch means coupled to said means for generating a torque difference signal for inhibiting said torque difference signal unless both said first and second engines are operating.

10. The power plant of claim 4 wherein said first and second engines are gas turbine engines and said means for controlling each of said engines in accordance with the control signal therefor is a fuel control circuit for each engine.

11. In a power plant having a first and a second engine, the outputs of which are coupled together for isochronous operation, each engine providing an output torque proportional to a control signal, an improved control circuit for balancing the torque between the first and the second engines comprising:
   means for generating a first torque difference signal proportional to any difference in the output torques of the first and second engines;
   means for generating a second torque difference signal equal in magnitude but opposite in sign from said first torque difference signal;
   means for generating a speed error signal proportional to any difference between a selected reference speed and the actual speed of the engines;
   means for combining said speed error signal with said first torque difference signal to provide the control signal for the first engine;
   means for combining said speed error signal with said second torque difference signal to provide the control signal for the second engine; and
   means for controlling each of said engines in accordance with the control signal therefor.

* * * * *